(12) United States Patent
Leuckel

(10) Patent No.: US 8,539,711 B2
(45) Date of Patent: Sep. 24, 2013

(54) FISHING LURE RETRIEVING APPARATUS

(76) Inventor: Chad Taras Leuckel, Inverness, FL (US)

( * ) Notice: Subject to any disclaimer, the term of this patent is extended or adjusted under 35 U.S.C. 154(b) by 151 days.

(21) Appl. No.: 13/066,511

(22) Filed: Apr. 15, 2011

(65) Prior Publication Data

US 2012/0261932 A1 Oct. 18, 2012

(51) Int. Cl.
*A01K 97/24* (2006.01)

(52) U.S. Cl.
USPC .................................. 43/17.2; 43/43.12; 43/4

(58) Field of Classification Search
USPC .................. 43/4, 17.2, 43.12, 18.1 HR, 25.2, 43/57.1, 57.2; 56/331–338; 30/233.5, 278
IPC ....................................................... A01K 97/24
See application file for complete search history.

(56) References Cited

U.S. PATENT DOCUMENTS

| | | | | |
|---|---|---|---|---|
| 1,801,675 A | * | 4/1931 | MaGuire | 56/336 |
| 2,475,687 A | * | 7/1949 | Baker | 56/333 |
| 3,902,306 A | * | 9/1975 | Rosenberg | 56/333 |
| 4,043,072 A | * | 8/1977 | Condurso | 43/17.2 |
| 4,085,537 A | * | 4/1978 | Todd | 43/17.2 |
| 4,463,545 A | * | 8/1984 | Giallanza | 56/337 |
| 4,531,352 A | * | 7/1985 | Henningsgaard | 56/336 |
| 4,563,834 A | * | 1/1986 | Spencer | 43/57.1 |
| 4,769,941 A | * | 9/1988 | Schmidt | 43/57.1 |
| 5,076,002 A | * | 12/1991 | Kelly | 43/17.2 |
| 5,410,836 A | * | 5/1995 | Hardy | 43/57.1 |
| 5,735,071 A | * | 4/1998 | Gouldie et al. | 43/4 |
| 6,038,807 A | * | 3/2000 | Taylor | 43/17.2 |
| 6,345,445 B1 | * | 2/2002 | Schofield | 30/249 |

\* cited by examiner

*Primary Examiner* — Darren W Ark
*Assistant Examiner* — Lisa Tsang
(74) *Attorney, Agent, or Firm* — Frank B. Arenas, Esq.

(57) ABSTRACT

A fishing lure retrieving device is disclosed. Versions of the invention utilize a body with a cavity and handle, a sleeve movably connected to the body, a cutter and closing line. Optional telescoping handle(s), magnet(s), closing fastener(s), sleeve end cap(s) and/or body end cap(s) may also be used with versions of the invention.

2 Claims, 7 Drawing Sheets

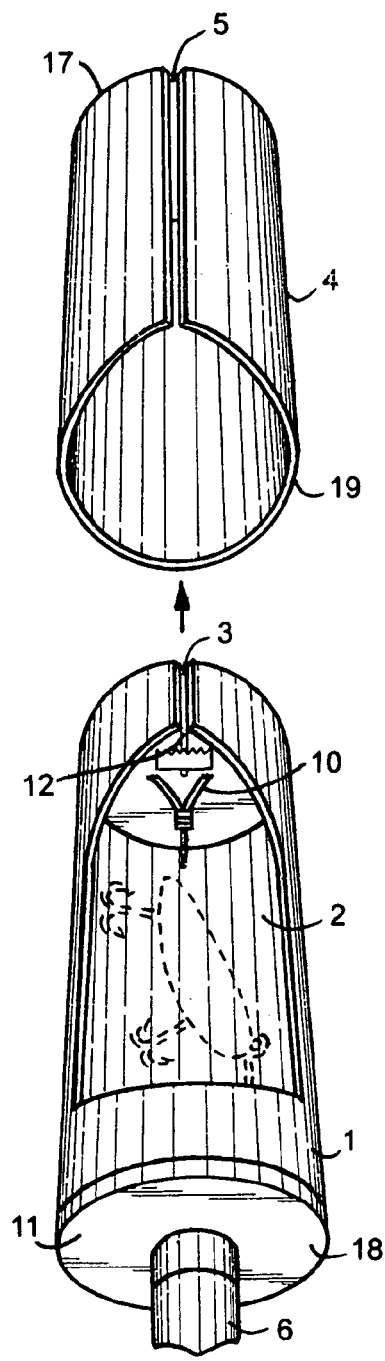
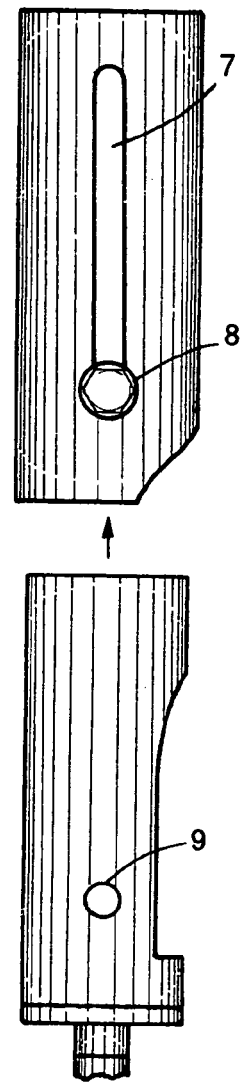
FIG.1
FIG.2

FISHING LURE RETRIEVING APPARATUS

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

1. Field of the Invention

Versions and embodiments of the present invention relate generally to fishing lures. Particularly, embodiments of the invention relate to devices for retrieving fishing lures. Specifically, versions of the invention relate to devices for retrieving fishing lures from trees, tree branches, power line and other structures and new, useful and unobvious versions thereof.

2. Description/Background of the Related Art

The art discussed herein is not to be considered admitted prior art but is presented to more clearly discuss and describe what is still lacking in the earlier art. If a fisherman (or operator) gets a fishing lure caught on a structure (fence, fence pole, power pole, power line, tree, tree branch and all other types of structures), prior art solutions to retrieve the lure were: climb the structure to retrieve the lure (potentially dangerous or not feasible due to the local environment); pull on the fishing line attached to the lure, usually breaking the line by exceeded the tensile strength of the line, losing the lure (or worse—the lure suddenly releasing from the entanglement and flying back at the fisherman, the sharp hooks causing medical injuries) or leave the lure and need to replace it, costing time and money. What is needed is a fishing lure retrieving device that solves the problems of the prior art.

No device and/or system is known to this inventor that addresses the deficiencies in the earlier art. This new, useful and unobvious invention, in various embodiments, accomplishes this much needed advantage of increase in safety and reduction of costs of replacing lures of conventional methods, devices and/or systems.

SUMMARY OF THE INVENTION

Advantages of versions of the present invention include avoidance of most if not all of the above problems with the prior art.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a perspective view of a version of some invention elements showing the body, cavity, cutting slot(s), sleeve and other optional elements.

FIG. 2 is a side view of a version of some invention elements.

Figure 3:
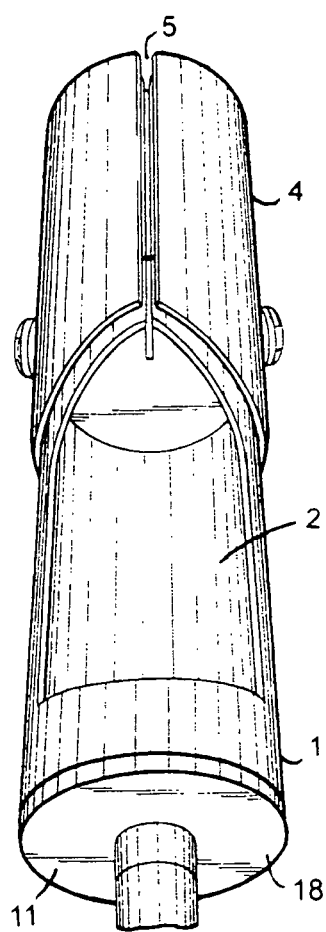
FIG. 3 is a perspective view of a version of the body and sleeve connected in "open" mode.

While the present invention will be described with reference to the details of the embodiments of the invention shown in the drawings (and some embodiments not shown in the drawings), these details are not intended to limit the scope of the invention, but merely for illustration.

As would be known by one of average skill in the art, such as a fisherman, fishing equipment designer and/or fishing lure manufacturer, modifications may be made that are intended to be within the scope of the invention.

DETAILED DESCRIPTION OF THE PREFERRED EMBODIMENT

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "include(s)" and/or "including" means "including but not limited to" any combination or permutation of all, one, some, a plurality or none of each of the item or list mentioned.

Figure 5:
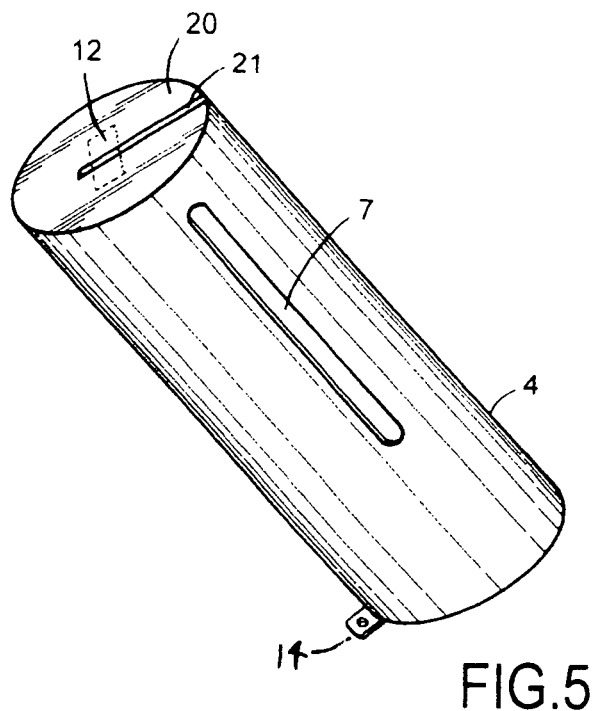
FIG. 5 is a perspective view of a version of a sleeve with optional elements.
Figure 6:
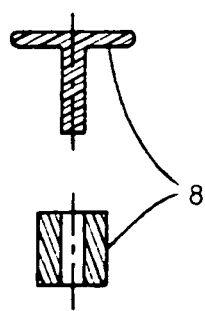
FIG. 6 is a cross section exploded view of a version of an attachment means.
Figure 7:
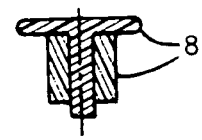
FIG. 7 is a cross section view of a version of an attachment means.
Figures 8, 9:
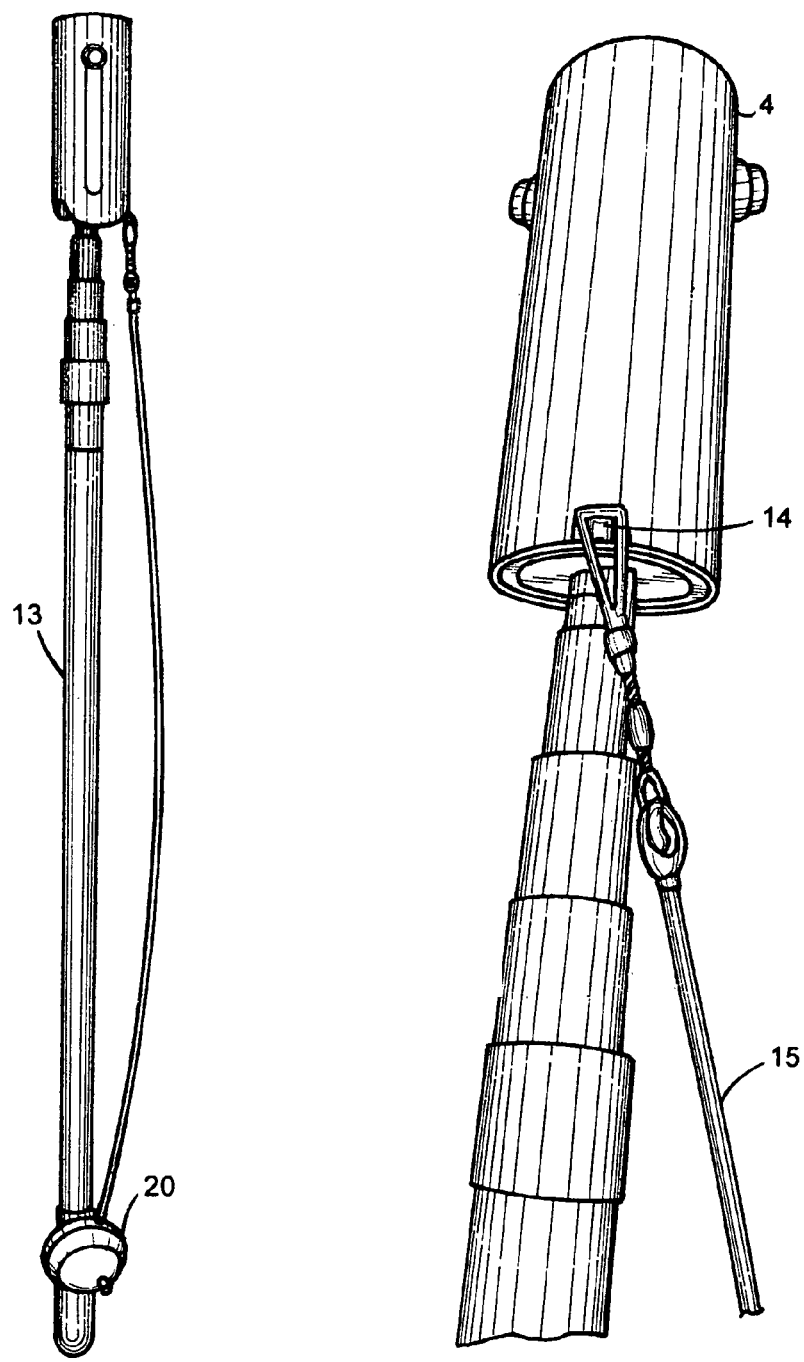
FIG. 8 is a side view of a version of the invention with optional telescoping handle and optional reel.
FIG. 9 is partial perspective view of a version of the invention in "closed" mode with sleeve and means for closing and closing fastener means.

The core of the version of the preferred basic embodiment of the invention is depicted in FIG. 1. The basic component is a body (body means) 1 with a cavity 2. Other elements include body slot (slot means) 3 and sleeve (sleeve means) 4 and sleeve slot (slot means) 5 and handle (handle means) 6. FIG. 2 shows the roller slot 7 and peg with roller 8 and peg attachment hole 9 (attachment means). Additional optional components (removable or fixed) are the sight/line guide/line feeder (line guide means) 10 and magnet 11. FIG. 5 shows a cutter 12 may be used, while other versions uses the sharpened cavity edge, sharpened body slot, sharpened sleeve slot (or other means for cutting) integrated in to the body, body cavity or sleeve(s). FIG. 8 and FIG. 9 depict additional optional components such as telescoping handle 13, closing line attachment (means for attaching) 14, closing line (means for closing) 15 and closing fastener (means for fastening). FIG. 5 shows the optional sleeve end cap 20 with sleeve end cap slot 21 and cutter 12. The body 1 optionally may provide these same elements 20, 21, and/or 12 either alone or in addition to the sleeve. These optional elements would be a body end cap, body end cap slot and cutter. The sleeve may use a plurality of sleeves to enlarge the scale of the device to allow retrieval of large lures, using a similar mechanism for the additional sleeves desired. Versions of the invention may use non-metallic/non-conducting materials to avoid electric shocks from electric structures. All of the above fabrication methods, procedures and materials are well known in the art and inherent in the making of versions of the invention.

All component(s)/element(s) may be removable or fixed. All component(s)/element(s) may be fabricated using metallic (all suitable metals) or non-metallic (plastic(s), polymer(s) wood, fiberglass, synthetic or all suitable non-metallic material) or any material that is appropriate for this use and known in the art.

The body means may comprise cylinder, square, rectangle or any polygon or any suitable shape. The sleeve means likewise may be any shape that is compatible with the body means.

The slot means may be of any suitable type known in the art—groove, slit, mechanism, friction fit, guide, roller or any other type.

The handle means may be solid, rigid, flexible, extendable, telescoping or any size or shape that is suitable for a handle means.

The means for cutting may be a sharpened edge of any shape or type, razor, serrated, V-shaped, scissors, heat source or any other cutting device of suitable type known in the art.

The means for attaching may be of any suitable type known in the art—loop, aperture, glue, sewn, webbing, fastener, screw, bolt, weld, connector link (either hard or "soft" as known in the art), grommet, snap, rivet, thread, rope, twine, rod, dowel, hook, plug, connector, and/or any other means, either attached/secured permanently, temporarily and/or releasably attached.

The means for closing may be any suitable flexible line cord, twine, rope, monofilament, etc. Lines such as DACRON, SPECTRA, nylon, etc. are well known in the industry and may be used, as well as any other type line suitable for this purpose. Or, other means for closing versions may use a rigid pole, electric motor, spring, machine, gravity, solenoid, remote control or any other suitable means for closing known in the art.

The means for fastening may be of any suitable type known in the art—loop, aperture, glue, sewn, webbing, fastener, screw, bolt, weld, connector link (either hard or "soft" as known in the art), grommet, snap, rivet, thread, rope, twine, rod, dowel, hook, plug, connector, and/or any other means, either attached/secured permanently, temporarily and/or releasably attached.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the operator.

At least one of the basic components may be used but a plurality may be utilized if desired for different versions of the invention.

Versions of the invention may be made with any and all suitable materials desired as needed for the appropriate use and is not limited by the type of materials that may be used. Versions are all scalable and may be made any suitable size; large, small and/or any size as desired to accommodate small fly fishing lures to large game fish lures as desired by the operator/fisherman.

Figure 4:
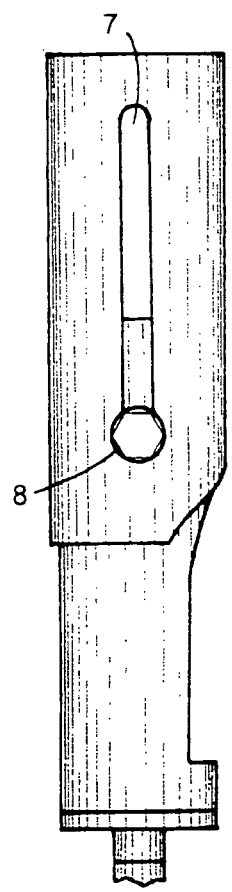
FIG. 4 is a side view of a version of the body and sleeve connected.

To make the invention in a preferred embodiment, one skilled in the art would use methods well known in the arts of metal fabricating, machine shop, polymer injection molding manufacturer and manufacturer(s) in related suitable fabrication art and follow the instructions, information and drawings disclosed in this patent application and proceed as follows (for illustration only and not intended to be limiting): fabricate the body 1 from, for instance, a piece of metal pipe, cutting and/or machining the cavity 2 and body slot 3 into said body 1. The sleeve 4 may also be fabricated, for example, from a piece of metal pipe (or the body 1 and sleeve 4 could be injection molded from plastic, for instance, or fabricated with rolled sheet metal or otherwise suitable fabrication methods) with the sleeve slot 5. As shown in the drawings, the cutter(s) 12 may be fabricated from a choice of suitable material(s) and attached to the top of the body and/or top of sleeve 17 (versions may use at least one and/or integrated into any suitable location). Next the optional sight/line guide/line feeder 10 may be fabricated from, for instance, a spring, metal collar wider than body slot 3 and wire and attached to the inside of the body as shown in FIG. 1. The handle 6 may be permanently attached, or releasably attached to the bottom of body 18. A version of the device is shown in "open" mode in FIG. 3, FIG. 4 and FIG. 11 and versions shown in "closed" mode in FIG. 8, FIG. 9 and FIG. 10.

Figure 10:
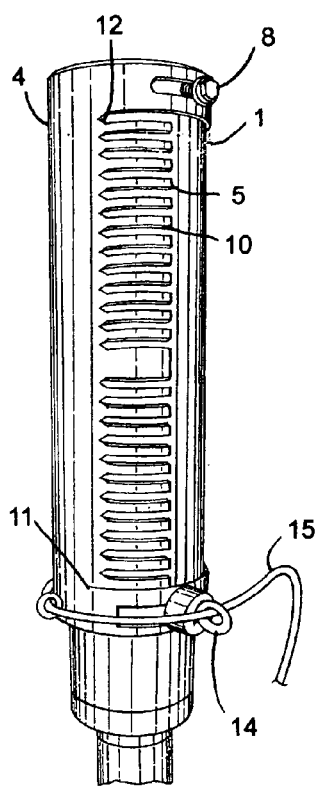
FIG. 10 shows a perspective view of another version of the invention in "closed" mode with alternate configurations of the elements with rotational freedom.

As shown in FIG. 8 and FIG. 9, the handle may be telescoping 13 with optional reel 20 and closing fastener, closing line attachment 14 and closing line 15 fabricated and attached to the sleeve 4. Or as shown in FIG. 10 and FIG. 11, the body and sleeve(s) may be cylindrical in shape integrated on an axis with rotational freedom and at least one of the elements/components arranged as shown in the drawings.

Figure 11:
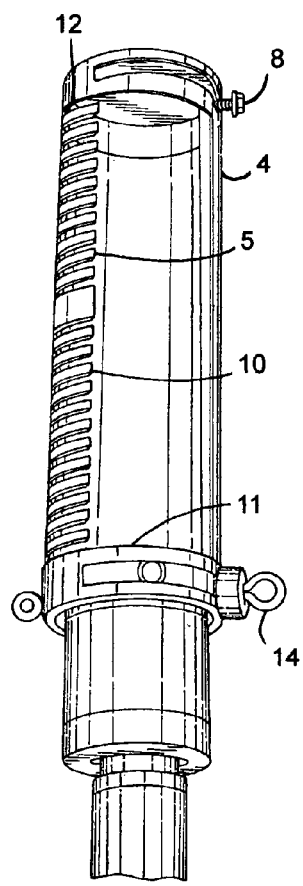
FIG. 11 shows a perspective view of another version of the invention in "open" mode with alternate configurations of the elements with rotational freedom.
Figure 12:
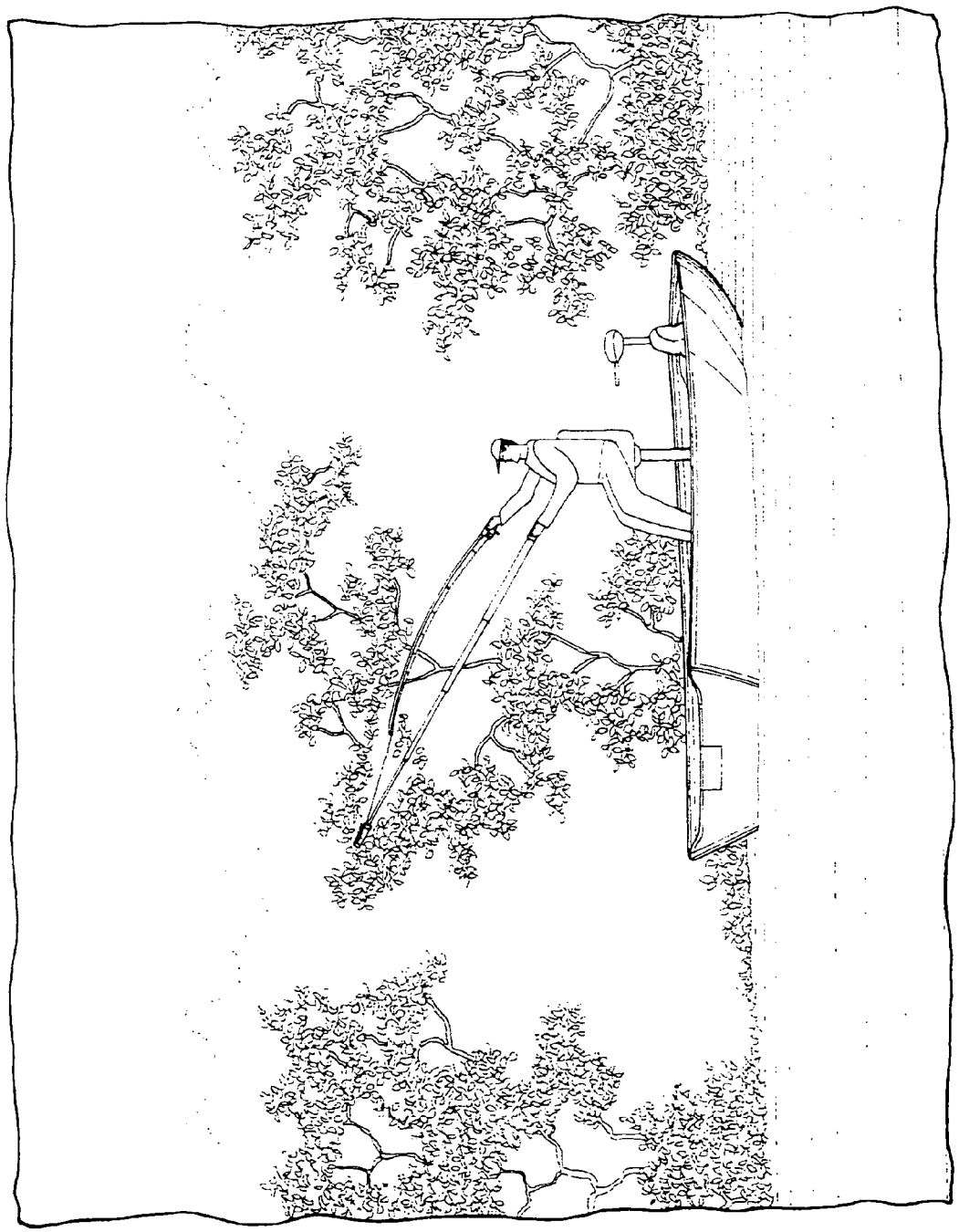
FIG. 12 depicts a typical operator (fisherman) using a version of the invention.
Figure 13:
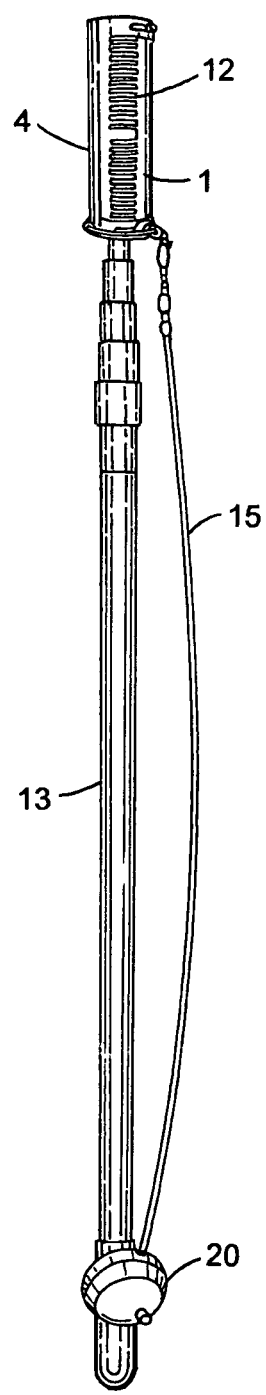
FIG. 13 shows a side view of another version of the invention with optional telescoping handle and optional reel.

To use the invention in this embodiment, one skilled in the art would extend the device in "open" mode to the entangled lure as shown in FIG. 11, trap the lure in the cavity (with or without optional magnet) and activate the means for closing and means for cutting which cuts the line and traps the lure in the cavity. The lure is then made accessible by the operator opening the device and retrieving the lure. Reversing the above method readies the device to be used again to retrieve another fishing lure.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function(s), instruction(s), component(s), application(s), interaction(s), item(s), product(s), good(s), group(s) and sub-group(s) as might be desirable or useful to someone skilled in the art.

As will be apparent to persons skilled in the art, such as a person in the fishing industry, fishing lure designer, fishing rod/reel designer, manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. A fishing lure retrieving device, comprising:
   at least one hollow cylindrical body of a desired length and diameter, the at least one hollow cylindrical body having at least one cavity, further comprising at least one telescoping handle of a desired length, height and width directly attached to the at least one hollow cylindrical body;
   further comprising at least one outer hollow cylindrical sleeve of a desired length and diameter movably connected to the at least one hollow cylindrical body with rotational freedom;
   further comprising a plurality of cutters for cutting a fishing line, the plurality of cutters arranged in a comb-like configuration and integrated into the at least one outer cylindrical sleeve, the plurality of cutters rotating around a longitudinal axis of the at least one hollow cylindrical body;
   further comprising at least one closing line attached to the at least one outer hollow cylindrical sleeve; and
   further comprising at least one reel directly attached to the at least one telescoping handle.

2. A fishing lure retrieving device, consisting of:
   at least one hollow cylindrical body of a desired length and diameter, the at least one hollow cylindrical body having at least one cavity, further comprising at least one telescoping handle of a desired length, height and width directly attached to the at least one hollow cylindrical body;
   further comprising at least one outer hollow cylindrical sleeve of desired length and diameter movably connected to the at least one hollow cylindrical body with rotational freedom; further comprising a plurality of cutters for cutting a fishing line, the plurality of cutters arranged in a comb-like configuration and integrated into the at least one outer cylindrical sleeve, the plurality of cutters rotating around a longitudinal axis of the at least one hollow cylindrical body; and,
   further comprising at least one closing line attached to the at least one outer hollow cylindrical sleeve; and
   further comprising at least one reel directly attached to the at least one telescoping handle.

* * * * *